United States Patent
Yoon (10) Patent No.: US 9,802,614 B1
(45) Date of Patent: Oct. 31, 2017

(54) APPARATUS AND METHOD FOR CONTROLLING LANE CHANGE CONSIDERING PRIORITY

(71) Applicant: HYUNDAI MOTOR COMPANY, Seoul (KR)

(72) Inventor: Ji Hyun Yoon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/263,785

(22) Filed: Sep. 13, 2016

(30) Foreign Application Priority Data

May 27, 2016 (KR) ........................ 10-2016-0065768

(51) Int. Cl.
| | | |
|---|---|---|
| *B60W 30/18* | (2012.01) | |
| *G08G 1/16* | (2006.01) | |
| *G05D 1/00* | (2006.01) | |
| *G05D 1/02* | (2006.01) | |
| *H04W 4/00* | (2009.01) | |

(52) U.S. Cl.
CPC ..... *B60W 30/18163* (2013.01); *G05D 1/0088* (2013.01); *G05D 1/021* (2013.01); *G08G 1/161* (2013.01); *H04W 4/005* (2013.01); *B60W 2550/20* (2013.01); *B60W 2600/00* (2013.01)

(58) Field of Classification Search
CPC ....... B60W 30/18163; B60W 2600/00; B60W 2550/20; G05D 1/0088; G05D 1/021; H04W 4/005; G08G 1/161
USPC ................................................... 701/23, 301
See application file for complete search history.

(56) References Cited

U.S. PATENT DOCUMENTS

| | | | | |
|---|---|---|---|---|
| 9,159,023 | B2 * | 10/2015 | Bone ............... | B60W 30/18163 |
| 9,280,899 | B2 * | 3/2016 | Biess ..................... | G08G 1/166 |
| 9,501,935 | B2 * | 11/2016 | Kastner ................. | B60W 30/09 |
| 2005/0015203 | A1 * | 1/2005 | Nishira .................. | G08G 1/167 |
| | | | | 701/301 |

(Continued)

FOREIGN PATENT DOCUMENTS

| | | |
|---|---|---|
| JP | 2007-320536 A | 12/2007 |
| JP | 2008-262418 A | 10/2008 |

(Continued)

OTHER PUBLICATIONS

Office Action Korean Patent Application No. 10-2016-0065768 dated Mar. 20, 2017.

*Primary Examiner* — Tyler J Lee
(74) *Attorney, Agent, or Firm* — McDermott Will & Emery LLP (57) ABSTRACT

There are provided an apparatus and a method for controlling a lane change considering priority. The apparatus for controlling a lane change includes: a collision judger checking whether or not there is an object vehicle having collision possibility that attempts to change a lane from a region of interest road corresponding to an ego-road on which an ego-vehicle is being driven to a target road to which the ego-vehicle changes the lane, before or during the lane change of the ego-vehicle; and a priority determiner determining a priority vehicle that first performs the lane change among the ego-vehicle and the object vehicle considering at least one of accessibility to the target road of the ego-vehicle and the object vehicle when there is the object vehicle, and accessibility to a join point when the object vehicle or the ego-vehicle is positioned on a road to be joined.

14 Claims, 6 Drawing Sheets

(56) References Cited

U.S. PATENT DOCUMENTS

| | | | |
|---|---|---|---|
| 2005/0256630 A1* | 11/2005 | Nishira | B60K 31/0008 701/96 |
| 2013/0085976 A1* | 4/2013 | Bone | B60W 30/18163 706/46 |
| 2014/0067250 A1* | 3/2014 | Bone | G08G 1/167 701/301 |
| 2014/0074356 A1 | 3/2014 | Bone et al. | |

FOREIGN PATENT DOCUMENTS

| | | |
|---|---|---|
| JP | 2011-113511 A | 6/2011 |
| JP | 2013-054614 A | 3/2013 |
| JP | 2015-060300 A | 3/2015 |
| JP | 2015-161518 A | 9/2015 |
| JP | 2015-174494 A | 10/2015 |
| KR | 10-2009-0122847 A | 12/2009 |
| KR | 10-1442702 B1 | 9/2014 |

* cited by examiner

APPARATUS AND METHOD FOR CONTROLLING LANE CHANGE CONSIDERING PRIORITY

CROSS-REFERENCE TO RELATED APPLICATION

This application is based on and claims the benefit of priority to Korean Patent Application No. 10-2016-0065768, filed on May 27, 2016 in the Korean Intellectual Property Office, the disclosure of which is incorporated herein in its entirety by reference.

TECHNICAL FIELD

The present disclosure relates to a technology of preventing a collision at the time of changing a lane, and more particularly, to an apparatus and a method for controlling a lane change considering priority that change the lane by considering the priority of a vehicle.

BACKGROUND

In general, vehicles, which are being driven on a road, may frequently change their lane, and when two vehicles attempt to change a lane toward the same lane, there is danger of accident.

Accordingly, according to the related art, when the lane change toward a target lane to be changed is performed, a collision danger with an object vehicle was determined by a vehicle sensor, based on speed of the object vehicle and a relative distance with an ego-vehicle.

SUMMARY

The present disclosure has been made to solve the above-mentioned problems occurring in the prior art while advantages achieved by the prior art are maintained intact.

An aspect of the present disclosure provides an apparatus and a method for controlling a lane change considering priority capable of performing a control so that a lane is changed avoiding a collision considering priority of the lane change of a vehicle.

Objects of the present disclosure are not limited to the objects described above, and other objects that are not described above may be clearly understood by those skilled in the art from the following description.

According to an exemplary embodiment of the present disclosure, an apparatus for controlling a lane change includes: a collision judger checking whether or not there is an object vehicle having collision possibility that attempts to change a lane from a region of interest road corresponding to an ego-road on which an ego-vehicle is being driven to a target road to which the ego-vehicle changes the lane, before or during the lane change of the ego-vehicle; and a priority determiner determining a priority vehicle that first performs the lane change among the ego-vehicle and the object vehicle considering at least one of accessibility to the target road of the ego-vehicle and the object vehicle when there is the object vehicle, and accessibility to a join point when the object vehicle or the ego-vehicle is positioned on a road to be joined.

According to another exemplary embodiment of the present disclosure, a method for controlling a lane change by at least one processor includes: checking whether or not there is an object vehicle having collision possibility that attempts to change a lane from a region of interest road corresponding to an ego-road on which an ego-vehicle is being driven to a target road, before or during the lane change of the ego-vehicle; and determining a priority vehicle that first performs the lane change among the ego-vehicle and the object vehicle considering at least one of accessibility to the target road when there is the object vehicle, and accessibility to a join point when the object vehicle or the ego-vehicle is positioned on a road to be joined.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The objects described above and other objects, and advantages and features of the present disclosure and methods to achieve them will be elucidated from exemplary embodiments described below in detail with reference to the accompanying drawings. However, the present disclosure is not limited to exemplary embodiments disclosed below, but will be implemented in various forms. The exemplary embodiments of the present disclosure make a description of the present disclosure thorough and are provided so that those skilled in the art can easily understand the scope of the present disclosure. Therefore, the present disclosure will be defined by the scope of the appended claims. Meanwhile, terms used in the present specification are to explain exemplary embodiments rather than limiting the present disclosure. Unless explicitly described to the contrary, a singular form includes a plural form in the present specification. The word "comprises" and/or "comprising" used in the present specification will be understood to imply the inclusion of stated component, steps, operations and/or elements but not the exclusion of any other components, steps, operations and/or elements.

Hereinafter, exemplary embodiments of the present disclosure will be described in detail with reference to the accompanying drawings.

Figure 1:
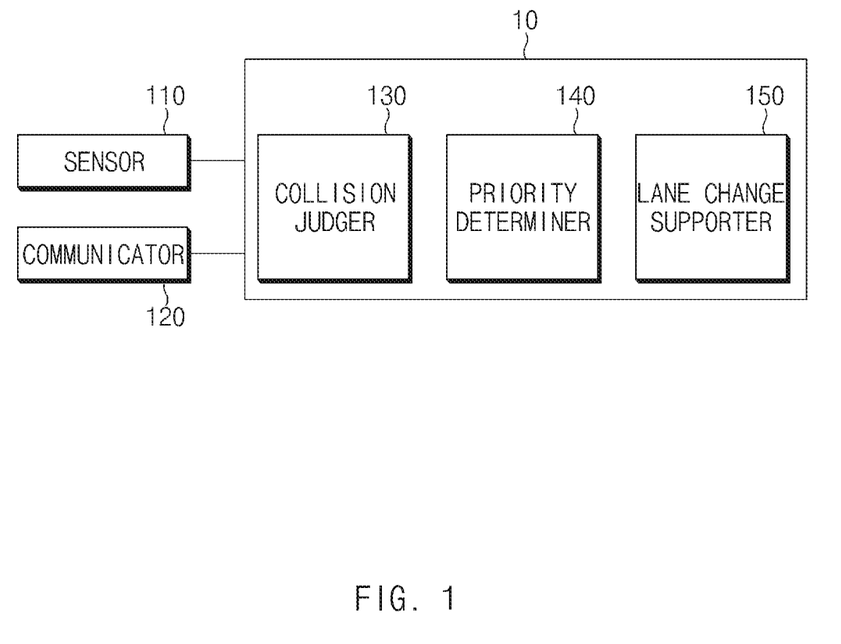
FIG. 1 is a block diagram illustrating an apparatus for controlling a lane change according to the present disclosure.

FIG. 1 is a block diagram illustrating an apparatus for controlling a lane change according to an exemplary embodiment of the present disclosure.

As illustrated in FIG. 1, an apparatus 10 for controlling a lane change according to an exemplary embodiment of the present disclosure includes a collision judger 130, a priority determiner 140, and a lane change supporter 150.

When an ego-vehicle attempts to change a lane on which the ego-vehicle is being driven, the collision judger 130 checks, based on received information from a sensor 110 and/or a communicator 120, a region of interest road corresponding to an ego-road on which the ego-vehicle is being driven. In addition, the collision judger 130 checks whether or not there is an object vehicle having collision possibility that attempts to change a lane from the region of interest road to a target road of the lane change of the ego-vehicle.

For example, in the case in which the ego-vehicle is being driven on a first road and the target road is a second road, the collision judger 130 may determine a third road as the region of interest road.

Here, in the case in which the ego-vehicle is a non-autonomous vehicle, the collision judger 130 may check the attempt of the lane change by a blinker operation, a handle operation, or the like of a driver.

Further, in the case in which the ego-vehicle is an autonomous vehicle, the collision judger 130 may check the attempt of the lane change by an autonomous driving value of an autonomous system. In this case, the collision judger 130, the priority determiner 140, and the lane change supporter 150 may be components of the autonomous system.

The collision judger 130 may check whether or not there is the object vehicle having collision danger, based on information received from least one sensor 110 of lidar, radar, and a camera. More particularly, the collision judger 130 may instruct the at least one sensor 110 to send a signal or an image from each of the sensors 110, and analyze the received signal or image to check whether or not there is the object vehicle having collision possibility.

Optionally or alternatively, the collision judger 130 may check whether or not there is the object vehicle having collision possibility, using vehicle-to-everything (V2X) or Vehicle to Vehicle (V2V) based communication or connectivity based communication via a communicator 120. In this case, the collision judger 130 may also check whether or not there is the object vehicle by checking a position of a surrounding vehicle by a GPS coordinate, or the like used by a path guidance device such as navigation, or the like, based on information received through the communicator 120.

Thus, the collision judger 130 may check whether or not a vehicle of interest which is being driven on the region of interest road is the object vehicle having collision possibility, based on driving speeds of the ego-vehicle and the surrounding vehicle, and a distance between the ego-vehicle and the surrounding vehicle. Information such as the speed of the ego-vehicle can be provided to the collision judger 130 by the ego-vehicle itself while information such as the speed and the relative position of the surrounding vehicle can be provided to the collision judger 130 by operations of the sensor 110 and/or the communicator 120. Information such as the distance between the ego-vehicle and the surrounding vehicle can be determined by the collision judger 130 with execution of stored computer-readable code or software by a processor of the collision judger 130.

In the case in which there is the object vehicle, the priority determiner 140 determines a priority vehicle that the lane change is first performed, among the ego-vehicle and the object vehicle considering at least one of accessibility to a join point, a reason of a lane change, and accessibility to the target road.

In this case, the priority determiner 140 determines the priority vehicle by different methods in the cases in which communication between the ego-vehicle and the object vehicle is available and is unavailable. Hereinafter, each of the cases will be separately described.

First, in the case in which the communication between the vehicles is unavailable, the priority determiner 140 determines the priority vehicle considering accessibility to the target road.

More particularly, the priority determiner 140 may determine a vehicle of which a body occupies the target road more than the other, or a vehicle which is closer to a center of the target road than the other, among the ego-vehicle and the object vehicle, as the priority vehicle. In this case, the priority determiner 140 may check accessibility to the target road based on the image or the signal from the at least one sensor 110.

Next, in the case in which the communication between the vehicles is available, the priority determiner 140 checks the reason of the lane change of the object vehicle through the communication between the vehicles via the communicator 120. In addition, the priority determiner 140 may determine a vehicle having the reason of the lane change having higher priority among the ego-vehicle and the object vehicle considering preset priority, as the priority vehicle.

Here, in the case in which the reasons of the lane change of the ego-vehicle and the object vehicle have the same priority, the priority determiner 140 may also determine the priority vehicle considering accessibility to the target road, similar to the case in which the communication between the vehicles is unavailable.

Alternatively, in the case in which at least one of the ego-vehicle and the object vehicle is being driven on a road which is joined with the target road, the priority determiner 140 may also determine a vehicle which is closer to the junction point as the priority vehicle.

In this case, the reason of the lane change described above may include at least one of a lane change due to no lane, a lane change for a right turn or a left turn, and a normal lane change.

In this case, the priority may be set to be high in order of the lane change due to no lane, the lane change for the left/right turn, and the normal lane change. Here, the normal lane change may be a change for a passing, a change for returning after the passing, a change for a driving using the target road, and the like.

Alternatively, also in the case in which the communication between the vehicles is available, the priority determiner 140 does not transmit and receive the reason of the lane change, and may also determine the priority vehicle using only at least one of accessibility to the join point and accessibility to the target road.

In the case in which the ego-vehicle is not the priority vehicle, but is the autonomous vehicle, the lane change supporter 150 may attempt to change the lane after the lane change of the object vehicle. In this case, the lane change supporter 150 may also perform a control such as deceleration, or the like, as needed.

In the case in which the ego-vehicle is not the priority vehicle, and is not the autonomous vehicle, the lane change supporter 150 may warn a driver of the danger of the lane change, or assist in controlling a lane keep.

Here, the lane change supporter 150 may be a blind spot detection device, and may also be a component that communicates with the blind spot detection device. Alternatively, the lane change supporter 150 may be a lane keep assistance system (LKAS), and may also be a component that communicates with the LKAS.

Meanwhile, according to the exemplary embodiment described above, the collision judger 130, the priority determiner 140, and the lane change supporter 150 may include at least one processor and at least one memory. Alternatively, the collision judger 130, the priority determiner 140, and the lane change supporter 150 may also be components included in the at least one processor. The memory may store a program, computer-readable code, or software. The above operations may be implemented with execution of the store program, computer-readable code, or software by the processor.

As described above, according to the exemplary embodiment of the present disclosure, since the collision danger of the two vehicles that change their lanes toward the same road may be prevented in advance, a safe driving of the driver may be supported.

Hereinafter, examples of determining priority of the apparatus for controlling a lane change according to an exemplary embodiment of the present disclosure will be described with reference to FIGS. 2A to 2D. FIGS. 2A to 2D are views illustrating examples of determining priority of the apparatus for controlling a lane change according to an exemplary embodiment of the present disclosure.

Case in which Communication Between Vehicles is Unavailable

Figure 2A:
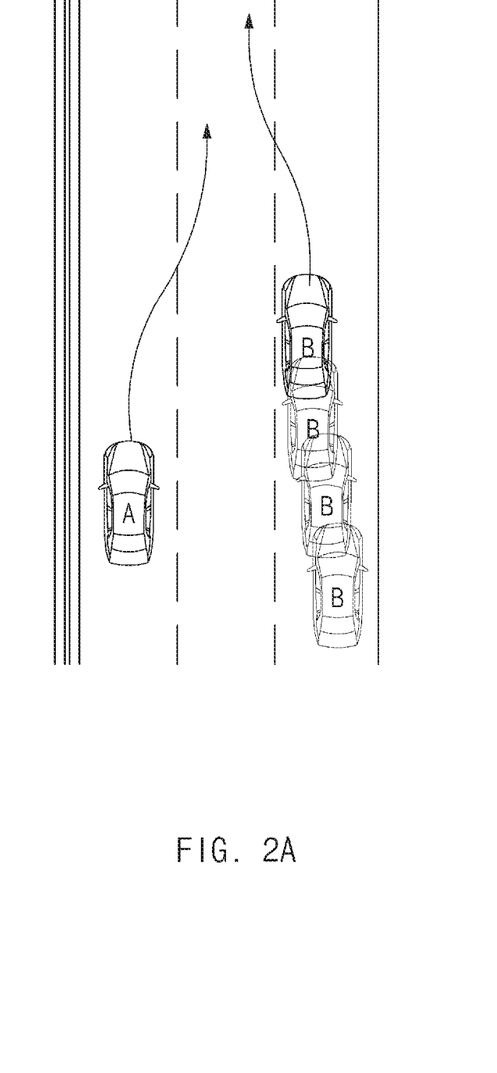
FIGS. 2A to 2D are views illustrating examples of determining priority of the apparatus for controlling a lane change according to the present disclosure.

Referring to FIG. 2A, the collision judger 130 of the ego-vehicle (vehicle A) that intends to change a lane to the second road while being driven on the first road checks whether or not a vehicle exists on a third road, which is the region of interest road. As a check result, since a vehicle B exists on the third road, the collision judger 130 judges whether or not the vehicle B on the third road attempts to change the lane.

The collision judger 130 may check, based on the information provided by the sensor 110 and/or the information on the vehicle B received from the communicator 120, that the vehicle B attempt to change the lane by checking that the vehicle B gradually becomes close to the second road from a transverse position variation of the vehicle B over time (see an image from a previous position to a current position of FIG. 2A).

The collision judger 130 may check whether or not the vehicle B is the object vehicle having the collision danger using speeds of the vehicle A and the vehicle B, and a distance between the vehicle A and the vehicle B.

For example, in the case in which the speed of the vehicle A is 80 km/h, the speed of the vehicle B (current position) ahead is 70 km/h, and a longitudinal distance between the two vehicles is 10 m, when the vehicles A and B simultaneously perform the lane change, the collision danger and sense of difference may occur. In this case, the collision judger 130 determines the vehicle B as the object vehicle, and informs the priority determiner 140 that the vehicle B is determined as the object vehicle.

Since both the vehicles A and B are not positioned on a join road, the priority determiner 140 determines the priority vehicle among the vehicles A and B considering accessibility to the second road, which is the target road, of the vehicles A and B.

In FIG. 2A, since the vehicle B is closer to the center of the second road than the vehicle A, the priority determiner 140 may determine the vehicle B as the priority vehicle. Accordingly, the vehicle B having priority may continue to perform the lane change.

In this case, in the case in which the vehicle A having low priority is the autonomous vehicle, the lane change supporter 150 of the vehicle A performs the lane change after securing a safety distance by deceleration or acceleration after the completion of the lane change of the vehicle B.

On the other hand, in the case in which the vehicle A is not the autonomous vehicle, the lane change supporter 150 of the vehicle A warns the driver of the vehicle A using a speaker, or the like so as not to change the lane. Alternatively, the lane change supporter 150 of the vehicle A may also support a lane keep control.

Meanwhile, unlike FIG. 2A, the ego-vehicle does not find the object vehicle at a point of time at which the lane change is determined, and may also check the object vehicle while the lane change is being performed.

Hereinafter, a method for controlling a lane change in the case in which the object vehicle is found while the lane change is being performed will be described with reference to FIG. 2B.

Figure 2B:
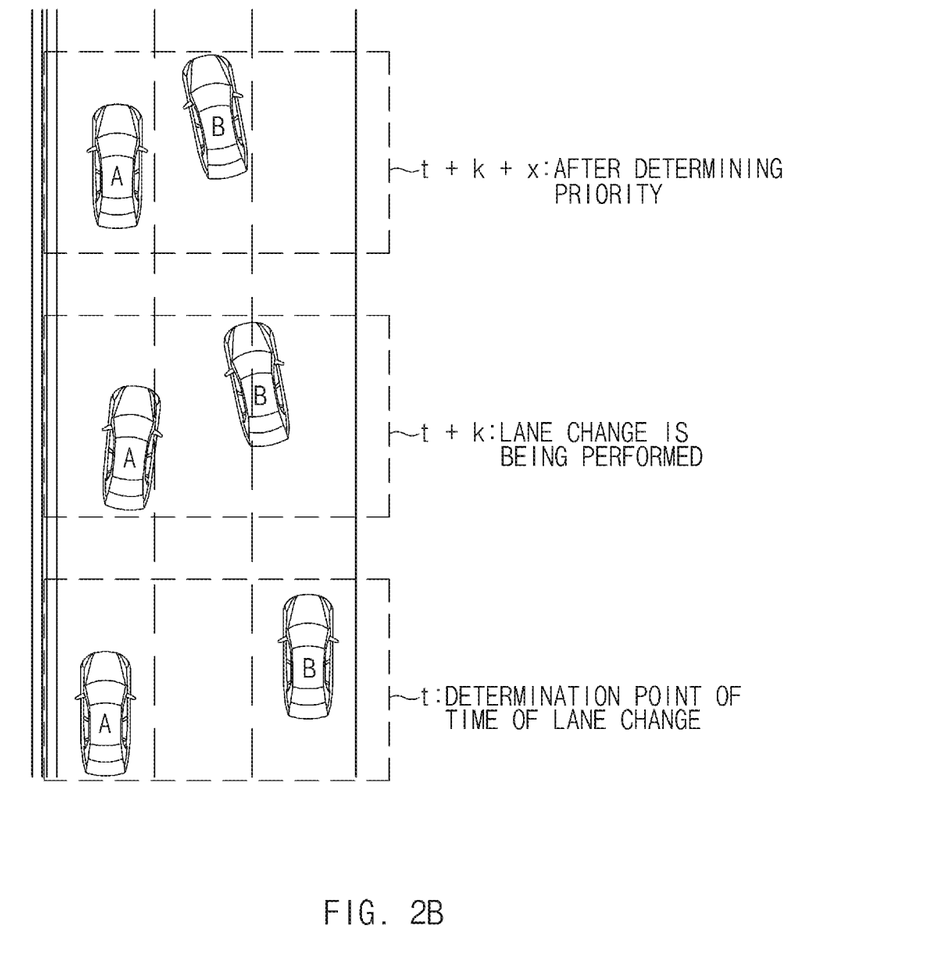

Referring to FIG. 2B, the vehicle A and the vehicle B determine the lane change and start the lane change at the same point of time t.

In addition, the collision judger 130 recognizes that the two vehicles simultaneously perform the lane change at a point of time (t+k) at which the lane change is being performed, and judges that there is a mutual collision danger.

As a check result, since the vehicle B is slightly closer to the center of the second road than the vehicle A and a body thereof also more comes over to the second road, the priority determiner 140 judges that the vehicle B is the priority vehicle.

Accordingly, the vehicle B having priority continues to perform the lane change to the second road at a point of time (t+k+x), which is after the determination of priority. In this case (the point of time (t+k+x)), the vehicle A returns to the first road, which is an original lane, and performs the lane change after securing the safety distance by deceleration or acceleration after the completion of the lane change of the vehicle B.

Meanwhile, as illustrated in FIGS. 2A and 2B, in the case in which the communication between the vehicles A and B is unavailable, when at least one of the vehicle A and the vehicle B exists on the join lane, a vehicle which is closer to the join point among the two vehicles may be determined as the priority vehicle.

Case in which Communication Between Vehicles is Available

Figure 2C:
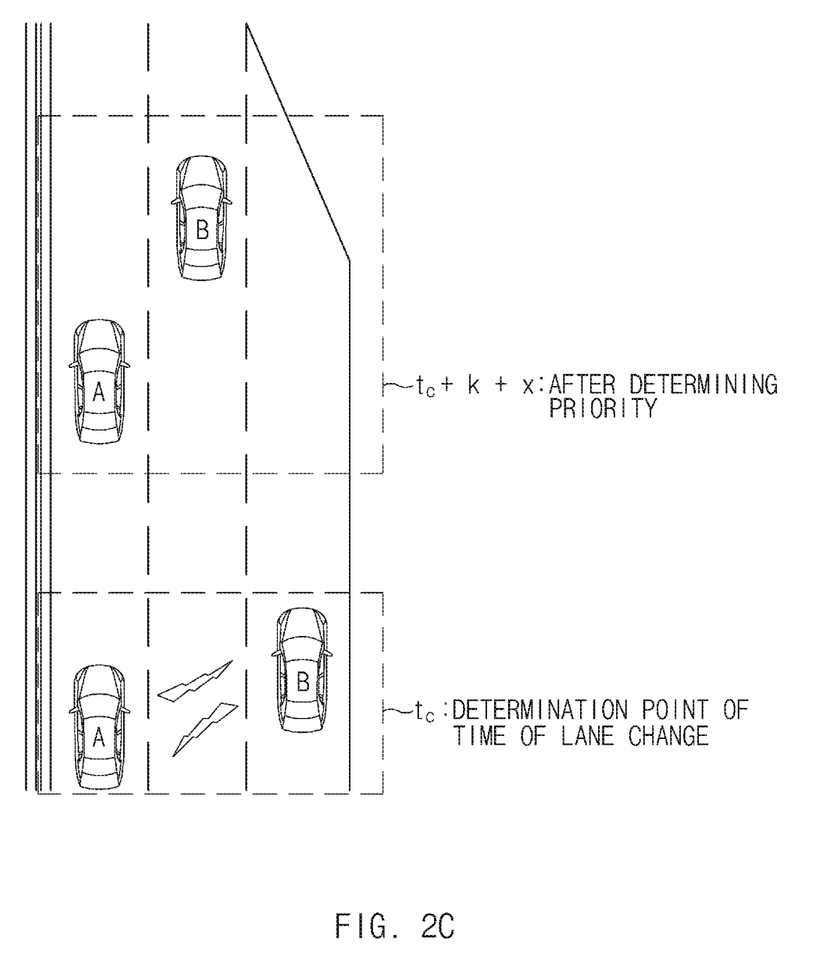

As illustrated in FIG. 2C, the collision judger 130 of the vehicle A and the vehicle B informs the surrounding vehicles that the lane change is performed, and information of the target road, using the communicator 120.

If there is the object vehicle having collision danger by the lane change to the same road among the surrounding vehicles, the collision judger 130 informs the object vehicle of the reason of the lane change ($t_c$).

However, since the reason of the lane change of the vehicle A is the passing (the normal lane change) and the reason of the lane change of the vehicle B is a lane join, the priority determiner 140 of the vehicles A and B determines that priority of the vehicle B is higher than that of the vehicle A.

Accordingly, after the vehicle B first completes the lane change, the lane change supporter 150 of the vehicle A attempts to change the lane while keeping a distance with the vehicle B ($t_c$+k+x).

Figure 2D:
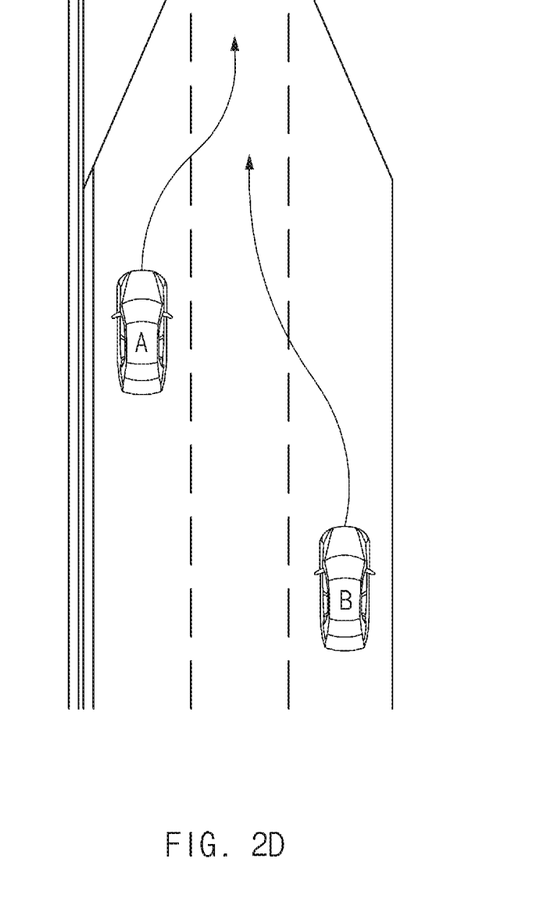

Alternatively, as illustrated in FIG. 2D, in the case in which both driving roads of the vehicles A and B are joined toward the target road, both the vehicles A and B need to perform the lane change to the target road. In this case, the vehicle A which is closer to the join point than the vehicle B first performs the lane change, and the vehicle B may perform deceleration and may then attempt to change the lane after the completion of the lane change of the vehicle A.

Hereinafter, a method for controlling a lane change according to an exemplary embodiment of the present disclosure will be described with reference to FIG. 3. FIG.

3 is a flowchart illustrating a method for controlling a lane change according to an exemplary embodiment of the present disclosure.

Figure 3:
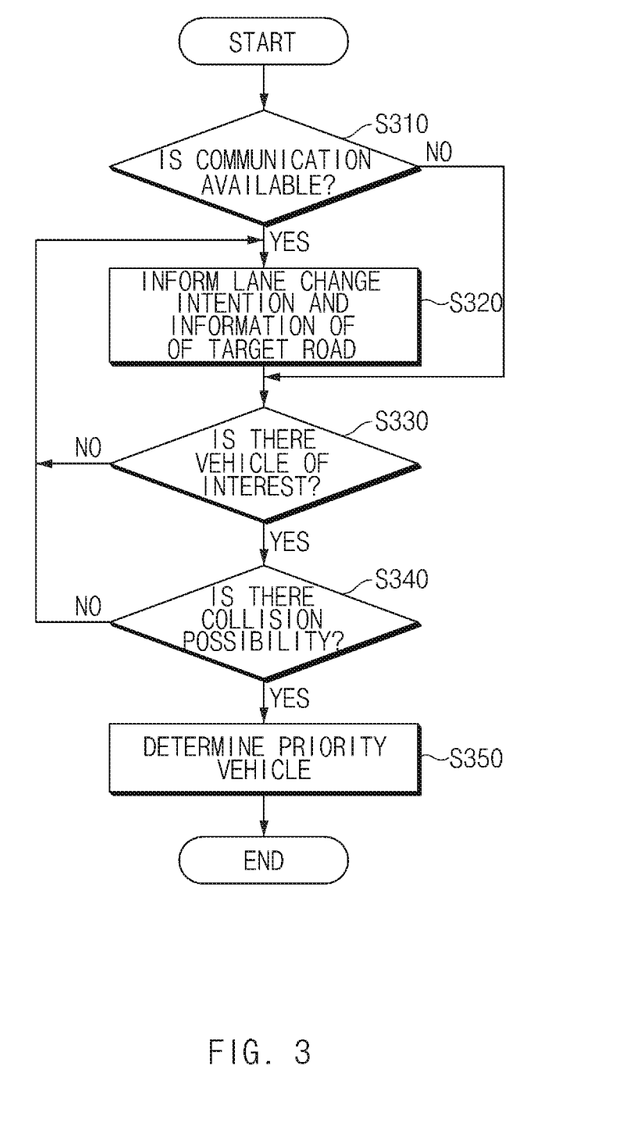
FIG. 3 is a flowchart illustrating a method for controlling a lane change according to the present disclosure.

Referring to FIG. 3, if vehicle to vehicle communication is available (Yes in S310), the collision judger 130 informs surrounding vehicles that a lane change is attempted (a lane change intention) and information of a target road, which is a road of which a lane is to be changed, before attempting the lane change using the vehicle to vehicle communication (S320).

Next, the collision judger 130 checks whether or not there is a vehicle of interest that attempts to change a lane to the target road on a region of interest road (S330).

In this case, the collision judger 130 may check whether or not there is the vehicle of interest using at least one of at least one sensor 110 such as lidar, radar, and a camera, communication of V2X, Vehicle to Vehicle (V2V) and connectivity based communications. As such, the collision judger 130 may check whether or not there is the vehicle of interest by receiving the lane change intention and the information of the target road from other vehicles.

In addition, the collision judger 130 may also check whether or not there is the vehicle of interest attempting the lane change by checking that a vehicle which is being currently driven on the region of interest road becomes close to the target road over time by the sensor 110.

If there is the vehicle of interest, the collision judger 130 checks whether or not there is collision possibility between the ego-vehicle and the vehicle of interest (S340). In this case, the collision judger 130 may check the collision possibility between the ego-vehicle and the vehicle of interest using speeds of the ego-vehicle and the vehicle of interest, and a longitudinal distance between the ego-vehicle and the vehicle of interest.

As a check result, if there is the collision possibility, the collision judger 130 may determine the vehicle of interest as the object vehicle.

The priority determiner 140 determines the priority vehicle using priorities of the reasons of the lane change of the ego-vehicle and the object vehicle (S350).

Here, the priority determiner 140 may also determine the priority vehicle using at least one of accessibility to the target lane of the ego-vehicle and the object vehicle, and accessibility to a join point when at least one of the ego-vehicle and the object vehicle is being driven on a road to be joined with the target road.

As described above, according to the exemplary embodiment of the present disclosure, since the collision danger of the two vehicles that change their lanes toward the same road may be prevented in advance, a safe driving of the driver may be supported.

As described above, according to the exemplary embodiments of the present disclosure, when the two vehicles change their lane into the same road, collision possibility between the two vehicles may be decreased.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a lane change, the apparatus comprising:
   a processor;
   a memory configured to store program instructions that, when executed, cause the processor to perform:
   checking an object vehicle which is being driven on a region of interest lane based on received information from a sensor;
   checking whether or not the object vehicle has a collision possibility that attempts to change a lane from the interest lane to a target lane based on a transverse position variation of the object vehicle or received information from the object vehicle, when an ego-vehicle attempts to change a lane from an ego-lane on which the ego-vehicle is being driven to the target lane; and
   determining a priority vehicle that first performs the lane change among the ego-vehicle and the object vehicle, based on at least one of accessibility to the target lane of the ego-vehicle and the object vehicle when there is the object vehicle, and accessibility to a join point when the object vehicle or the ego-vehicle is positioned on a lane to be joined.

2. The apparatus according to claim 1, wherein the memory is further configured to store program instructions that, when executed, cause the processor to perform:
   informing surrounding vehicles of a lane change intention and information of the target lane through vehicle to vehicle (V2V) or Vehicle to Vehicle (V2V) communication when the lane change is required, and
   informing the object vehicle of a reason of a lane change through the vehicle to vehicle communication when there is the object vehicle.

3. The apparatus according to claim 2, wherein the reason of the lane change includes at least one of a lane change due to no lane, a lane change for a right turn or a left turn, and a normal lane change which are listed in priority order thereof.

4. The apparatus according to claim 2, wherein the memory is further configured to store program instructions that, when executed, cause the processor to perform:
   determining the priority vehicle among the ego-vehicle and the object vehicle considering preset priority of the reason of the lane change, when the reason of the lane change is received from the object vehicle.

5. The apparatus according to claim 2, wherein the memory is further configured to store program instructions that, when executed, cause the processor to perform:
   determining the priority vehicle based on the accessibility to the target lane checked and the accessibility to the join point in accordance with information received from the sensor, when the object vehicle does not receive the reason of the lane change, or the reasons of the lane change of the ego-vehicle and the object vehicle have the same priority.

6. The apparatus according to claim 1, wherein the memory is further configured to store program instructions that, when executed, cause the processor to perform:
   attempting the lane change after the lane change of the object vehicle when the ego-vehicle is not the priority vehicle and is an autonomous vehicle.

7. The apparatus according to claim 1, wherein the memory is further configured to store program instructions that, when executed, cause the processor to perform:

informing a driver of a danger of the lane change, or performing a lane keep control, when the ego-vehicle is not the priority vehicle and is not an autonomous vehicle.

8. A method for controlling a lane change by a processor, the method comprising:
checking, by the processor, an object vehicle which is being driven on a region of interest lane based on received information from a sensor;
checking, by the processor, whether or not the object vehicle has a collision possibility that attempts to change a lane from the interest lane to a target lane, when an ego-vehicle attempts to change a lane from an ego-lane on which the ego-vehicle is being driven to the target lane; and
determining, by the processor, a priority vehicle that first performs the lane change among the ego-vehicle and the object vehicle considering at least one of accessibility to the target lane when there is the object vehicle, and accessibility to a join point when the object vehicle or the ego-vehicle is positioned on a lane to be joined.

9. The method according to claim 8, further comprising:
informing, by the processor, surrounding vehicles including the object vehicle of a lane change intention and information of the target lane through vehicle to vehicle (V2V) communication when the lane change is required; and
informing, by the processor, the object vehicle of a reason of a lane change of the ego-vehicle through the vehicle to vehicle communication when there is the object vehicle.

10. The method according to claim 9, wherein the reason of the lane change includes at least one of a lane change due to no lane, a lane change for a right turn or a left turn, and a normal lane change which are listed in priority order thereof.

11. The method according to claim 9, wherein the determining of the priority vehicle includes determining the priority vehicle among the ego-vehicle and the object vehicle considering preset priority of the reason of the lane change when the reason of the lane change is received the object vehicle.

12. The method according to claim 9, wherein the determining of the priority vehicle includes determining the priority vehicle considering at least one of the accessibility to the target lane of the ego-vehicle and the object vehicle and the accessibility to the join point when the object vehicle does not receive the reason of the lane change, or the reasons of the lane change of the ego-vehicle and the object vehicle have the same priority.

13. The method according to claim 8, further comprising attempting, by the processor, the lane change after the lane change of the object vehicle when the ego-vehicle is not the priority vehicle, but is an autonomous vehicle.

14. The method according to claim 8, further comprising informing, by the processor, a driver of a danger of the lane change, or performing a lane keep control, when the ego-vehicle is not the priority vehicle and is not an autonomous vehicle.

* * * * *